US007630318B2

(12) United States Patent
Ward et al.

(10) Patent No.: US 7,630,318 B2
(45) Date of Patent: Dec. 8, 2009

(54) FILTERING WIRELESS NETWORK PACKETS

(75) Inventors: Robert Geoffrey Ward, Colorado Springs, CO (US); Andrew McArthur, Colorado Springs, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 722 days.

(21) Appl. No.: 11/011,067

(22) Filed: Dec. 15, 2004

(65) Prior Publication Data

US 2006/0126515 A1 Jun. 15, 2006

(51) Int. Cl.
*H04L 12/56* (2006.01)
(52) U.S. Cl. ........................ 370/241; 370/397
(58) Field of Classification Search ............... 370/395, 370/392, 349, 421; 455/423, 436
See application file for complete search history.

(56) References Cited

U.S. PATENT DOCUMENTS

| 5,541,926 | A | * | 7/1996 | Saito et al. ................... 370/474 |
| 5,586,264 | A | * | 12/1996 | Belknap et al. .............. 725/115 |
| 5,884,297 | A | * | 3/1999 | Noven ....................... 370/395.3 |
| 6,018,518 | A | * | 1/2000 | Smallwood et al. .......... 370/235 |
| 6,081,533 | A | * | 6/2000 | Laubach et al. .............. 370/421 |
| 6,118,763 | A | * | 9/2000 | Trumbull ..................... 370/231 |
| 6,345,037 | B2 | * | 2/2002 | St-Denis et al. .............. 370/230 |
| 6,490,284 | B1 | * | 12/2002 | Graf ......................... 370/395.2 |
| 6,526,056 | B1 | * | 2/2003 | Rekhter et al. .............. 370/392 |
| 6,587,463 | B1 | * | 7/2003 | Hebb et al. .................. 370/392 |
| 6,892,287 | B1 | * | 5/2005 | Millard et al. ............... 711/158 |
| 6,912,390 | B2 | * | 6/2005 | Andersson et al. ........... 455/436 |
| 7,012,899 | B1 | * | 3/2006 | Hagler et al. ................ 370/252 |
| 7,020,141 | B1 | * | 3/2006 | Stacey et al. ............. 370/395.21 |
| 7,116,683 | B1 | * | 10/2006 | Petersen et al. .............. 370/474 |
| 7,146,537 | B2 | * | 12/2006 | Kolbe .......................... 714/28 |
| 7,193,982 | B2 | * | 3/2007 | Frerking et al. .............. 370/335 |
| 7,310,342 | B2 | * | 12/2007 | Rouleau ...................... 370/397 |
| 7,324,498 | B2 | * | 1/2008 | Ahn et al. .................... 370/349 |
| 7,327,740 | B2 | * | 2/2008 | Racz et al. ................. 370/395.6 |
| 7,463,636 | B2 | * | 12/2008 | Brueckheimer et al. 370/395.64 |

(Continued)

FOREIGN PATENT DOCUMENTS

GB 2382502 5/2003

(Continued)

OTHER PUBLICATIONS

Web ProForum Tutorials, http://www.iec.org, "UMTS Protocols and Protocol Testing", The International Engineering Consortium, Aug. 2006.

*Primary Examiner*—Thong H Vu (57) ABSTRACT

A universal mobile telephony system (UMTS) network monitoring system for capturing intercepted UMTS data. ATM cells from a UTRAN interface may be intercepted. The UTRAN interface may be an Iu interface, an Iur interface, or an Iub interface, which are, respectively, interfaces between a core network (CN) of the UTRAN and a radio network controller (RNC) of the UTRAN, an interface between RNCs of the UTRAN, and an interface between a Node B of the UTRAN and an RNC of the UTRAN. The ATM cells may be reassembled into UMTS packets of the UTRAN, among which user plane packets may be segregated from control plane UMTS packets based on fields and bytes of the reassembled UMTS packets. The control plane packets may be stored to a non-volatile storage medium of the network monitoring system or processed in real time and results thereof displayed graphically.

20 Claims, 8 Drawing Sheets

U.S. PATENT DOCUMENTS

| | | | | |
|---|---|---|---|---|
| 2002/0181463 A1* | 12/2002 | Knight | | 370/392 |
| 2002/0183053 A1* | 12/2002 | Gopalakrishna et al. | | 455/423 |
| 2002/0186721 A1* | 12/2002 | Bohn | | 370/522 |
| 2003/0105799 A1* | 6/2003 | Khan et al. | | 709/201 |
| 2003/0112758 A1* | 6/2003 | Pang et al. | | 370/235 |
| 2004/0071086 A1* | 4/2004 | Haumont et al. | | 370/230 |
| 2004/0077345 A1* | 4/2004 | Turner et al. | | 455/423 |
| 2004/0196793 A1* | 10/2004 | Lucidarme et al. | | 370/252 |
| 2004/0202186 A1* | 10/2004 | Kimura et al. | | 370/395.65 |
| 2004/0208120 A1* | 10/2004 | Shenoi | | 370/229 |
| 2005/0195829 A1* | 9/2005 | Ward | | 370/395.6 |
| 2007/0183429 A1* | 8/2007 | Yang et al. | | 370/395.6 |

FOREIGN PATENT DOCUMENTS

| | | |
|---|---|---|
| WO | WO02/49375 | 6/2002 |
| WO | WO03/09672920 | 11/2003 |

* cited by examiner

Iub Filtering
132

| | store condition | suppress condition |
|---|---|---|
| 1 Signaling Store | Any AAL2 reassembled packet that has a length <= 64 and packet is within a user defined VPI/VCI range | |
| 2 FP Contol Store | Any AAL2 reassembled FP control packet that has a length <= 64 and packet is within a user defined VPI/VCI range (An FP control packet is one that has bit 0 of the first byte equal to logical 1) | |
| 3 NBAP, ALCAP Store | Any AAL5 reassembled packet that has a length <= 40 and packet is within a user defined VPI/VCI range | |
| 4 POLL suppress | | Any AAL5 reassembled packet that has a length = 8 and the 5th byte is 0x0A and packet is within a user defined VPI/VCI range |
| 5 BGN (begin) suppress | | Any AAL5 reassembled packet that has a length = 8 and the 5th byte is 0x01 and packet is within a user defined VPI/VCI range |
| 6 END suppress | | Any AAL5 reassembled packet that has a length = 8 and the 5th byte is 0x13 and packet is within a user defined VPI/VCI range |
| 7 Line Speech Suppress | | Any AAL2 reassembled packet that has a length <= 64 and the 3rd to 5th bytes are {0x02, 0x01, 0x01} and packet is within a user defined VPI/VCI range |
| 8 STAT Suppress | | Any AAL5 reassembled packet that has a length = 12 and the 9th byte is 0x0B and is in the downlink direction (to the mobile user) and packet is within a user defined VPI/VCI range |

FIGURE 5

Iu Filtering

134

| | store condition | suppress condition |
|---|---|---|
| 1 POLL suppress | | Any AAL5 reassembled packet that has a length = 8 and the 5th byte is 0x0A and packet within a user defined VPI/VCI range |
| 2 BGN (begin) suppress | | Any AAL5 reassembled packet that has a length = 8 and the 5th byte is 0x01 and packet is within a user defined VPI/VCI range |
| 3 END suppress | | Any AAL5 reassembled packet that has a length = 8 and the 5th byte is 0x13 and packet is within a user defined VPI/VCI range |
| 4 STAT Suppress | | Any AAL5 reassembled packet that has a length = 12 and the 9th byte is 0x0B and is in the downlink direction (to the mobile user) and packet is within a user defined VPI/VCI range |
| 5 NBAP, ALCAP store | Any AAL5 reassembled packet that has a length <= 40 and packet is within a user defined VPI/VCI range | |
| 6 IP store | Any AAL5 reassembled packet that has a length <= 40 and packet is within a user defined VPI/VCI range | |

FIGURE 6

Iur Filtering

136

| | store condition | suppress condition |
|---|---|---|
| 1 Signaling Store | Any AAL2 reassembled packet that has a length <= 64 and packet is within a user defined VPI/VCI range | |
| 2 FP Contol Store | Any FP control packet and packet is within a user defined VPI/VCI range (an FP control packet is one that has bit 0 of the first byte equal to logical 1) | |
| 3 RNSAP, ALCAP Store | Any AAL5 reassembled packet that has a length <= 40 and packet is within a user defined VPI/VCI range | |
| 4 POLL suppress | | Any AAL5 reassembled packet that has a length = 8 and the 5th byte is 0x0A and packet is within a user defined VPI/VCI range |
| 5 BGN (begin) suppress | | Any AAL5 reassembled packet that has a length = 8 and the 5th byte is 0x01 and packet is within a user defined VPI/VCI range |
| 6 END suppress | | Any AAL5 reassembled packet that has a length = 8 and the 5th byte is 0x13 and packet is within a user defined VPI/VCI range |
| 7 STAT Suppress | | Any AAL5 reassembled packet that has a length = 12 and the 9th byte is 0x0B and is in the downlink direction (to the mobile user) and packet is within a user defined VPI/VCI range |

FILTERING WIRELESS NETWORK PACKETS

BACKGROUND

Wireless networks are transitioning from second generation to third generation networks. Two emerging third generation wireless network schemes are the UMTS (Universal Mobile Telecommunications System) and the CDMA2000 (Code-division Multiple Access). Firms that deploy these types of networks must monitor network traffic, often in real time. Embodiments described herein relate to monitoring wireless network traffic.

DETAILED DESCRIPTION OF THE PREFERRED EMBODIMENTS

Some relevant acronyms are well known in the art of wireless networks but are repeated here for the reader's convenience. The term "UMTS" refers to the Universal Mobile Telecommunications System, which is a known industry standard for a type of mobile telecommunications system. The term "CN" refers to a core network. The term "Node B" refers to a UMTS base station or physical tower. The term "RNC" refers to a radio network controller. The term "Iub" refers to an interface or link between a Node B and an RNC. The term "Iur" refers to an interface or link between an RNC and another RNC. The term "Iu" refers to an interface or link between an RNC and a CN. The term "UTRAN" refers to a UMTS terrestrial radio access network, which is an actual implementation of a UTMTS Additionally, the term "VPI" (virtual path indicator) refers to an 8-bit or 12 bit field in the header of an ATM cell. The term "VCI" (virtual channel indicator) refers to a 16-bit field in the header of an ATM cell. ATM switches use the VPI/VCI fields to identify the next VCL (virtual channel link) that a cell needs to transit on its way to its final destination. In other words, the VCI together with the VPI is used to identify the next destination of a cell as it passes through a series of ATM switches on its way to its destination. ATM switches use the VPI/VCI fields to identify the next network VCL (virtual channel link) that an ATM cell needs to transit on its way to its final destination. The terms "user plane" and "control plane" are well known in the art and are discussed in the IEC publication mentioned below. They generally refer to user-oriented packets (user plane) and control or system oriented packets (control plane).

Figure 1:
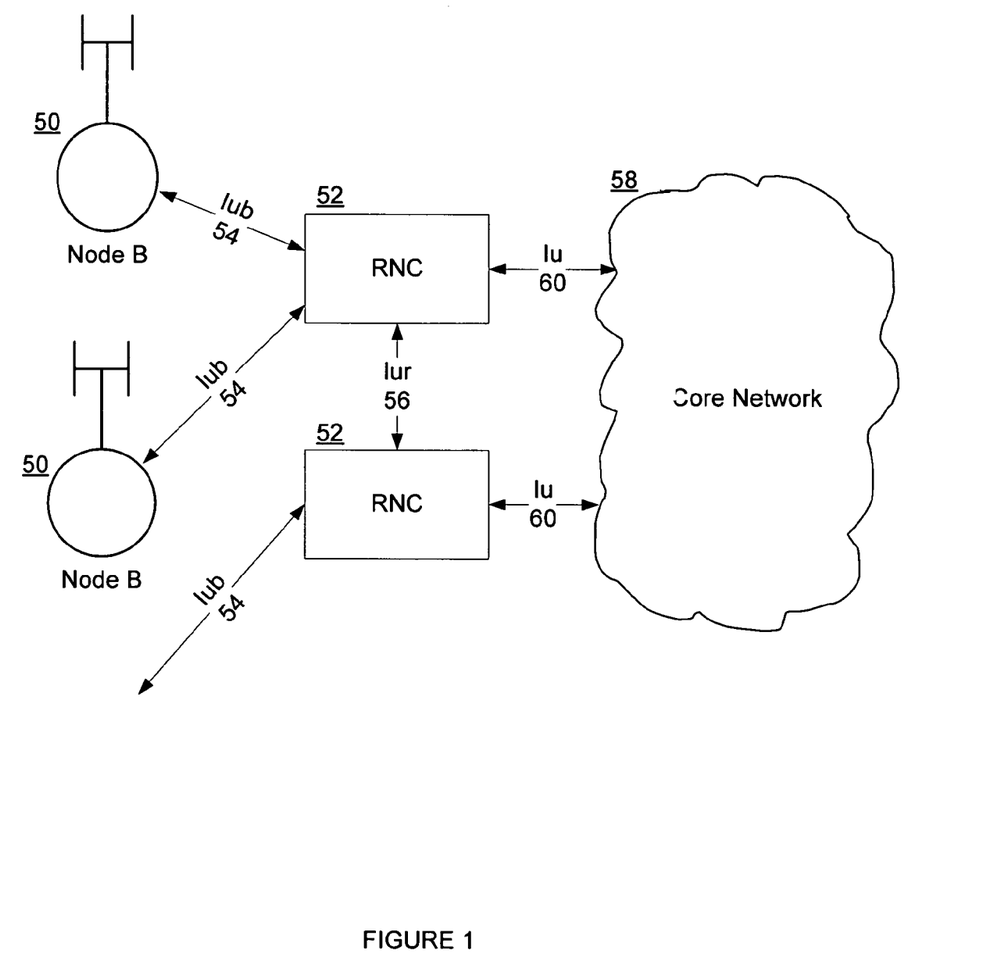
FIG. 1 shows a typical portion of a UTRAN.

FIG. 1 shows a typical portion of a UTRAN. In FIG. 1, Node B's 50 communicate with RNCs 52 via Iubs 54. The RNCs 52 communicate with each other via an Iur 56 and with a CN 58 via Ius 60. For additional background discussion of the UMTS and a UTRAN, see the International Engineering Consortium's ("IEC") tutorial titled "Universal Mobile Telecommunications System (UMTS) Protocols and Protocol Testing", published by the IEC, and, as of Dec. 13, 2004 available at www.iec.org/online/tutorials/acrobat/umts.pdf, and incorporated herein by reference.

With a UMTS, there is a common part loosely called the core network, CN, or just core (see e.g. CN 58 in FIG. 1). The UMTS standard has been described as an extension of existing networks, for example the CN exists in both second generation (2G) and third generation (3G) wireless networks. A UTRAN such as shown in FIG. 1 is divided into different RNSs (Radio Network Systems), each controlled by an RNC. The RNC is connected to a set of Node B elements, each of which can serve one or several cells. The core network or CN 58 can be a GSM Phase2+core network, for example, which can be found in 2G networks. Other components of the UTRAN are generally specific to 3G networks.

Embodiments discussed herein relate to testing and/or monitoring the UTRAN. Test or monitor equipment works with an RNC (such equipment is discussed below with reference to FIG. 8). The test/monitor equipment can hook into the Ius, Iurs, and Iubs and intercept cells/packets therefrom (or receives intercepted cells/packets). One piece of test equipment can monitor all three types of links at one time. Again, the UTRAN diagram in FIG. 1 shows what the test/monitor equipment can hook into and monitor in real time. For example, testing/monitoring can be performed by use of optical splitters on an OC-3 or an STM-1 at the RNC.

An RNC is an expensive piece of equipment—about the size of a filing cabinet—and has links to the Node B's (Iub links). An RNC can have one or more physical links (e.g. T1 or E1) for each Node B. Then, per concepts of 3G networks such as the UTMS, one RNC can talk to many Node B's, and each one can go over an ATM network, each being distinguishable by its ATM VCI/VPI. ATM is preferably the transport; a Node B talks to an RNC over an ATM link. User, voice, video, signaling data, etc. is carried over the ATM link.

When there are many Iub links (Node B's) on one RNC, instead of using a 2 MB E1, an OC3 or STM1 link may be used (155 MB), which will go to a router which routes the different virtual paths to the respective Node B's. A hook onto one or more of these links (E1, OC3, etc.) is provided. The inventors have observed that the rate of data to be intercepted and monitored may potentially increase as the number and capacity of these links increase. The inventors have projected that streaming intercepted test/monitor data to disk can become impractical in the near to distant future. For example, storage can be quickly exhausted. Furthermore, the capacity of the network connection (e.g. LAN connection) between a capture device and a PC or monitoring device may be insufficient. The inventors have determined that there is a need to intelligently reduce the bandwidth of data going to PC/monitor 78 or other test/monitor equipment or that is otherwise being used to monitor real time wireless packets.

Figure 2:
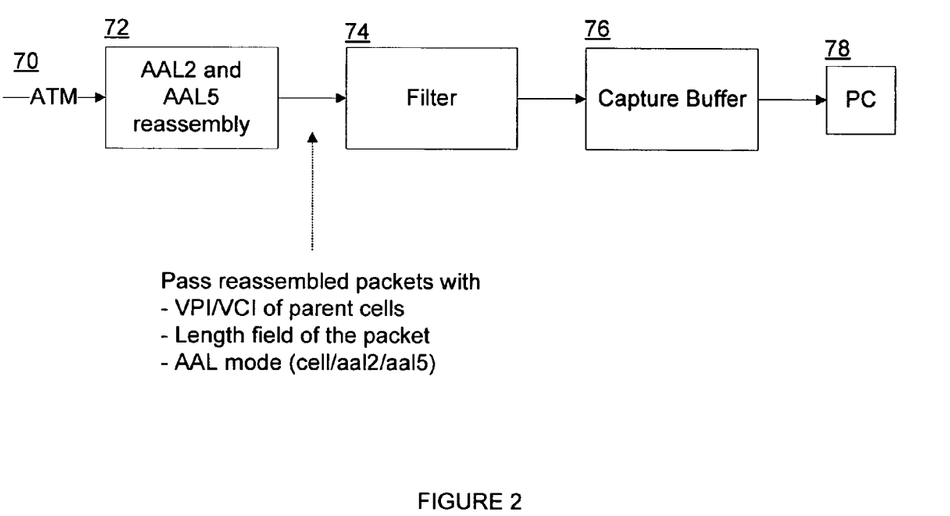
FIG. 2 shows a data flow diagram.

FIG. 2 shows a data flow diagram. Intercepted ATM cells 70 are received. The cells are reassembled 72 to ATM adaptation layer type 2 (AAL2) and to ATM adaptation layer 5 (AAL5) reassembled packets. AAL2 is usually used to transport small packets, which is useful for voice data and other time sensitive data. AAL5 is usually used to transport larger packets such as text or IP data that is less time sensitive. The reassembled packets are tagged with the VPI/VCI of their parent cells, a length field indicating the length of the respective packet, and an AAL mode (e.g. cell/AAL2/AAL5). The reassembled packets are filtered 74 and passed to a capture buffer 76. From the capture buffer 76 the filtered packets can flow to a workstation, test/monitor device, or PC 78 for analysis by a user. Alternatively, the packet-capturing device may be equipped with its own storage medium and packets may be stored locally at the capture device. Details of filtering 74 are discussed further below with reference to FIGS. 4-7.

The first box in the filter diagram of FIG. 2 is the interception or snoop point. The test equipment monitors the respective lines or ATM links 54, 56, and/or 60, and generally can take one of three approaches to handle cells/packets intercepted therefrom. Looking at the ATM cells, it can send everything to a capture buffer and can come along later and look at it manually, by software, etc. However, as mentioned above, this approach is limited by the size of the capture buffer. Or, the test equipment can send the data traffic taken off the lines straight to a PC/workstation (usually over a LAN or some other shared network connection), which can then analyze it in real time to make conclusions about the link or the network. A Signaling Analyzer Real Time ("SART") test equipment performs a "call trace" function, which can capture and display in real time all data related to a call made with a mobile device. An example of a SART is a J7326A available from Agilent Technologies. Even this approach can be constrained by high volumes of intercepted data, for example because the data may need to pass through a test device or PC's network connection. Finally, rather than viewing captured data in real time, a user can opt to stream all of the data to disk storage. However, if the user returns at a later time, terabytes of data may have accumulated, and analysis becomes cumbersome if not impossible. Each test/monitor approach mentioned above can be improved by providing filtering 74.

Regarding filtering 74, if only ATM cells are parsed then the information primarily available for intelligent packet processing would be the particular corresponding Node B (known via the VPI). This is less than useful for a user who desires to look at events on many different Node B's at one time or otherwise perform pan-network analysis. For example, a user may be interested in data related to a handover when a mobile device or call gets handed over from one Node B to another. The user may desire to observe packets generated to handle the handover. In this case, more intelligent filtering is called for. Furthermore, users that monitor, test, or observe a mobile wireless network are interested generally in signaling and control data as opposed to user data such as voice data. Reassembled ATM data is convenient to intelligently filter and therefore it is preferable to reassemble 72 ATM cells prior to filtering 74. Reassembly 72 may be performed with available technology, such as with a logic design running in an FPGA (field programmable gate array).

Figure 3:
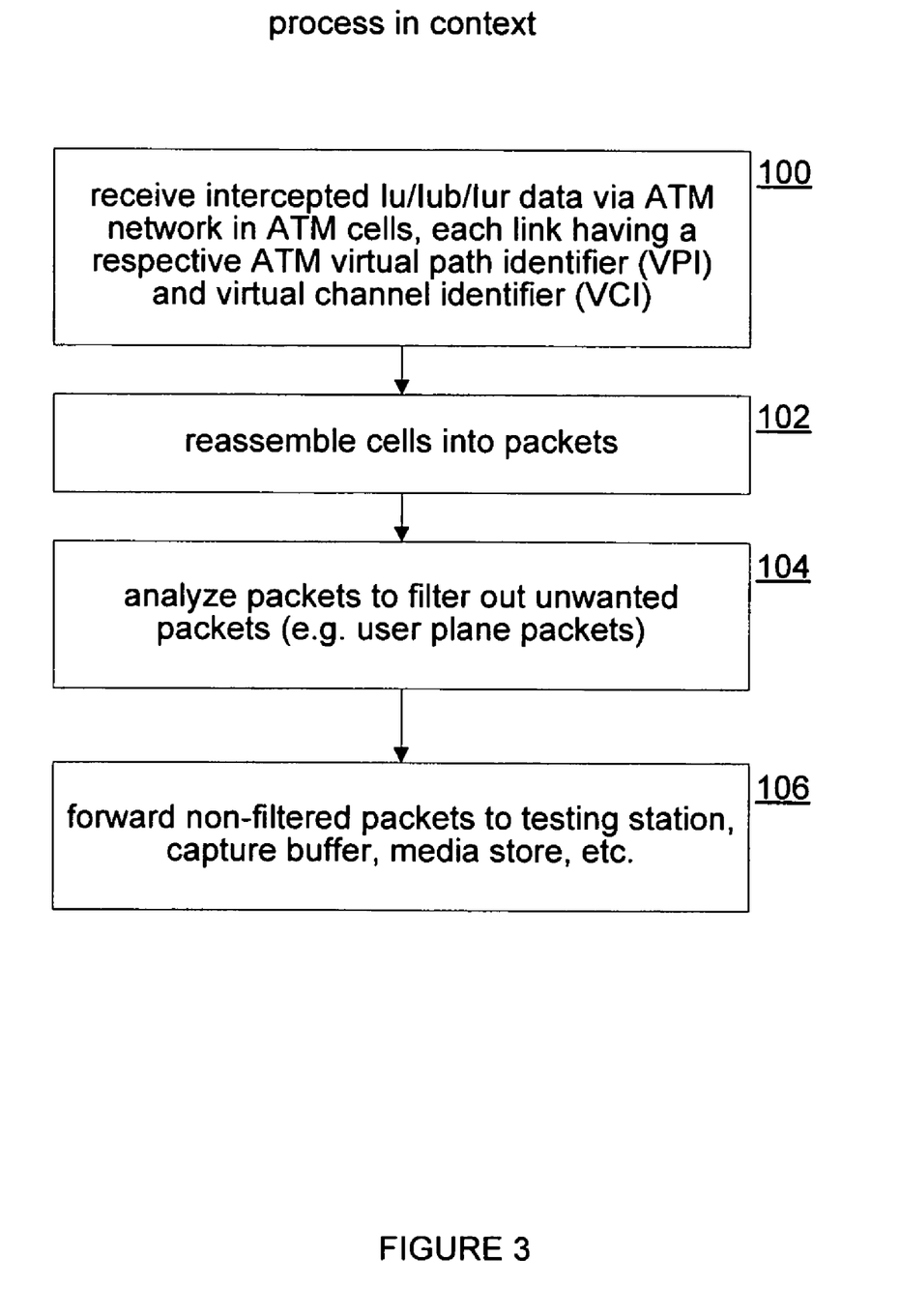
FIG. 3 shows a reassembly and filtering process.

FIG. 3 shows a reassembly and filtering process. Data is intercepted 100 from Ius, Iubs, and/or Iurs, for example by a measurement (see e.g. Measurement System 142 in FIG. 8). The intercepted data or cells 102 are reassembled 102 into the Iu, Iub, and/or Iur packets that they are transporting. The reassembled packets are analyzed 104 to filter, remove, or suppress unwanted packets, preferably packets in the UTMS user plane. Non-filtered packets are forwarded 106, preferably over a LAN or other network connection to a testing station, capture device, etc. (see e.g. PC 144 in FIG. 8).

Figure 4:
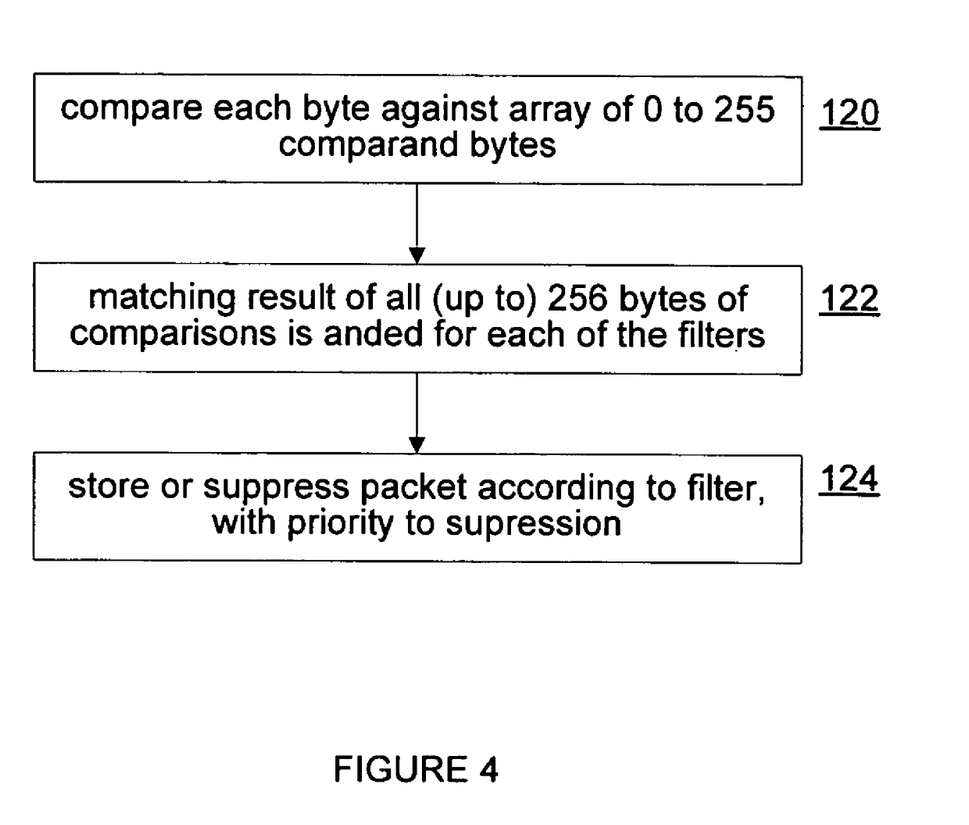
FIG. 4 shows a process of filtering packets.

FIG. 4 shows a process of filtering packets. Bytes of an incoming packet are compared 120 against a plurality of arrays of 0 to 255 comparand bytes. Matching results of the plurality of comparisons are logically "anded" 122 for each filter, and according to the result stored or suppressed 124. In one implementation, suppression may have priority over storing (non-suppressing). As each byte is received it can be compared against a mask to see which bits are the bits of interest and to see if it matches a predefined byte. Although this can be done in parallel for received bytes, each individual byte may be checked for a match. After examining up to 256 bytes of a packet, it can be concluded whether the packet matches a pattern and therefore can be kept or discarded or otherwise segregated.

Figure 5:
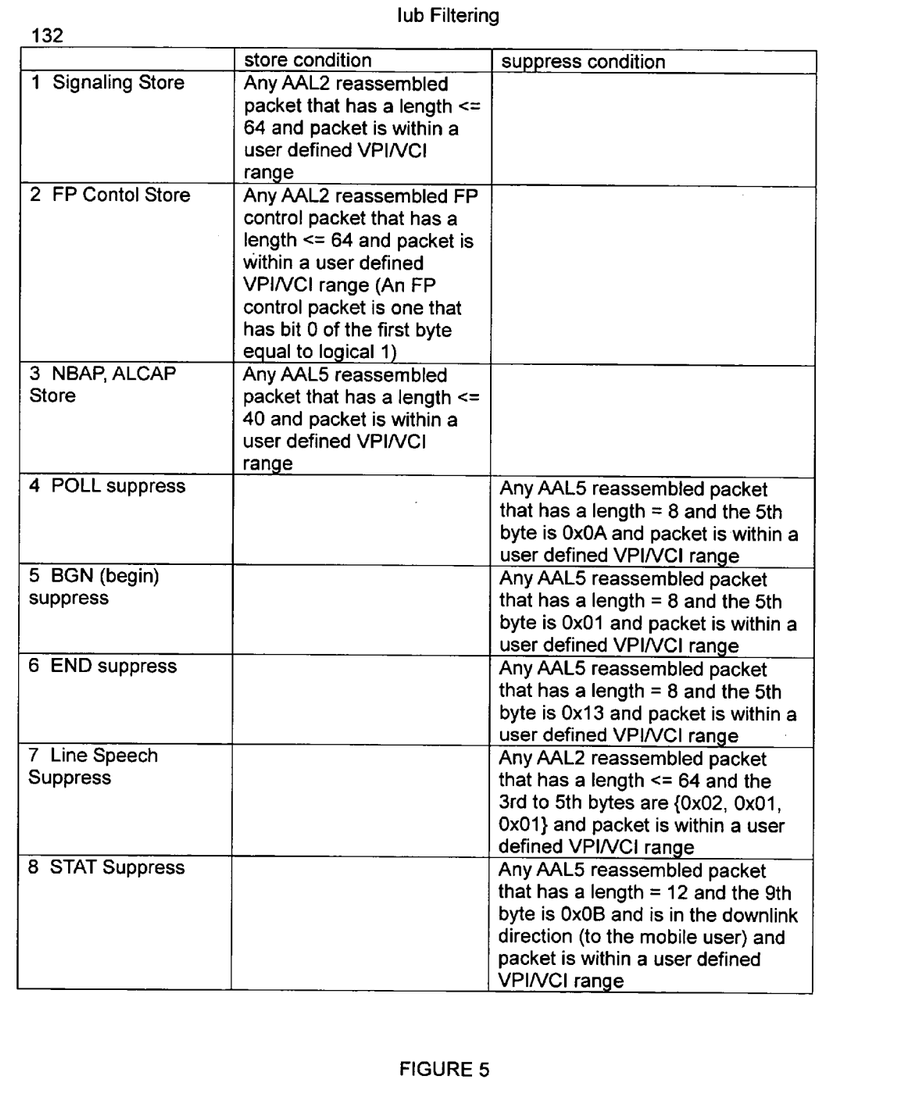
FIG. 5 shows filter patterns or conditions for Iub filtering.
Figure 6:
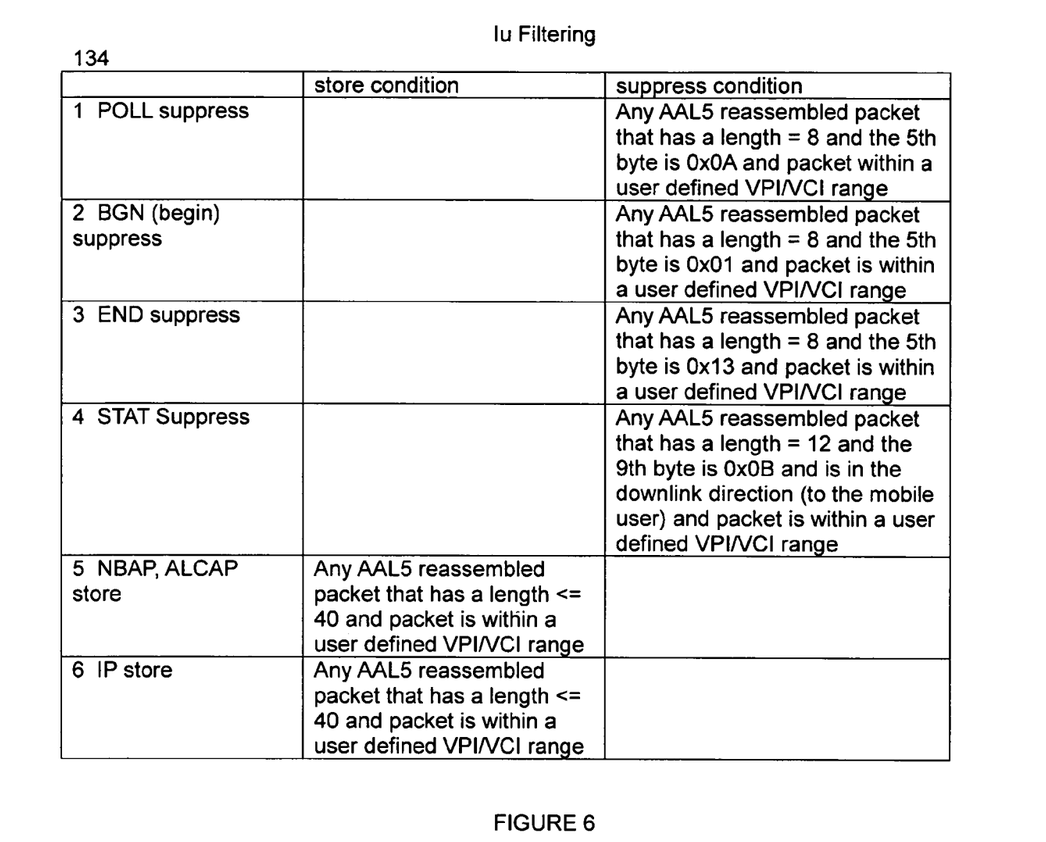
FIG. 6 shows filter patterns or conditions for Iu filtering.
Figure 7:
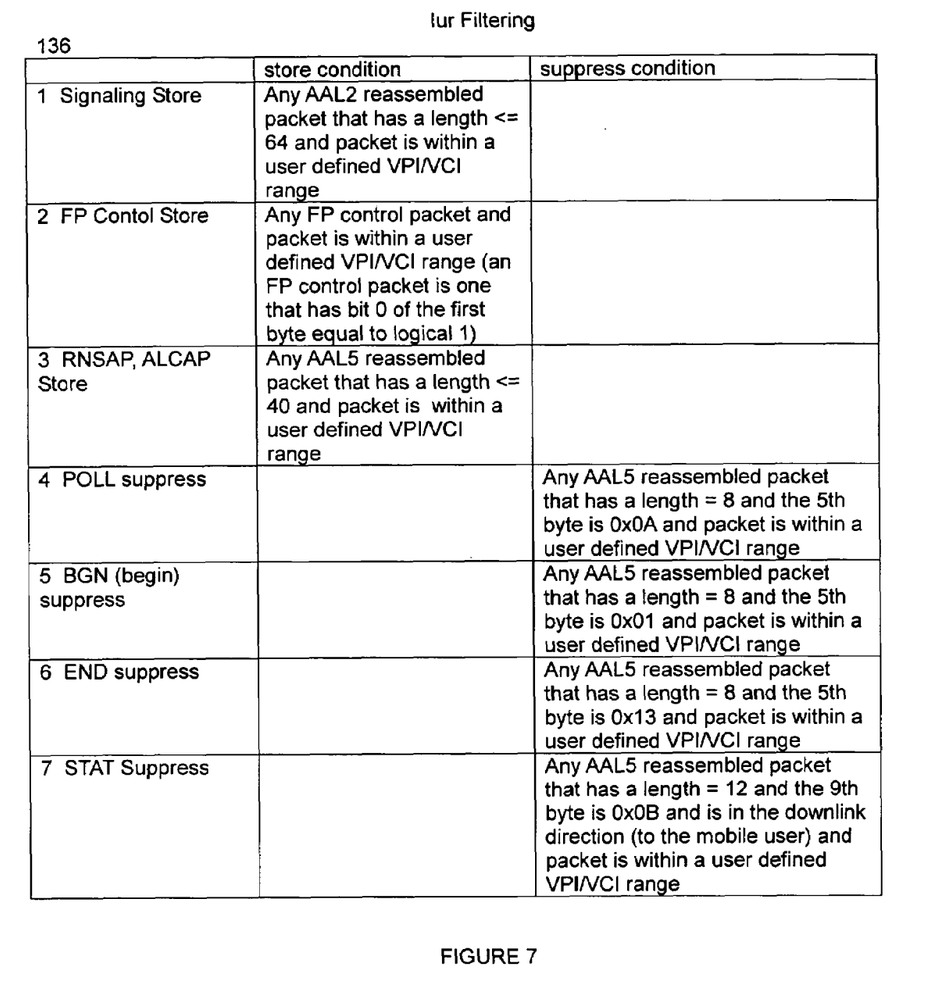
FIG. 7 shows filter patterns or conditions for Iur filtering.

FIG. 5 shows filter patterns or conditions 130 for Iub filtering. FIG. 6 shows filter patterns or conditions 132 for Iu filtering. FIG. 7 shows filter patterns or conditions 134 for Iur filtering. As can be seen in these FIGS. 5-7, filtering or packet segregation can be based on whether a packet is an AAL2 or AAL5 packet, whether its VPI/VCI is within a given range, whether its length is under a given value, whether certain pattern bytes are found in certain locations in a packet, the uplink/downlink direction of a packet, and/or whether the packet is a known control packet (e.g. FP control packet), and the like, and in different combinations as needed. One skilled in the art of computer programming can implement the conditions in FIGS. 5-7 in any number of ways. For example, a field programmable gate array may be used. A software based state machine can also be used to logically apply the conditions. One skilled in the art will appreciate that substantially most, if not all user plane data will preferably be filtered out. However, in some cases some small amount of user plane data may be passed through.

Figure 8:
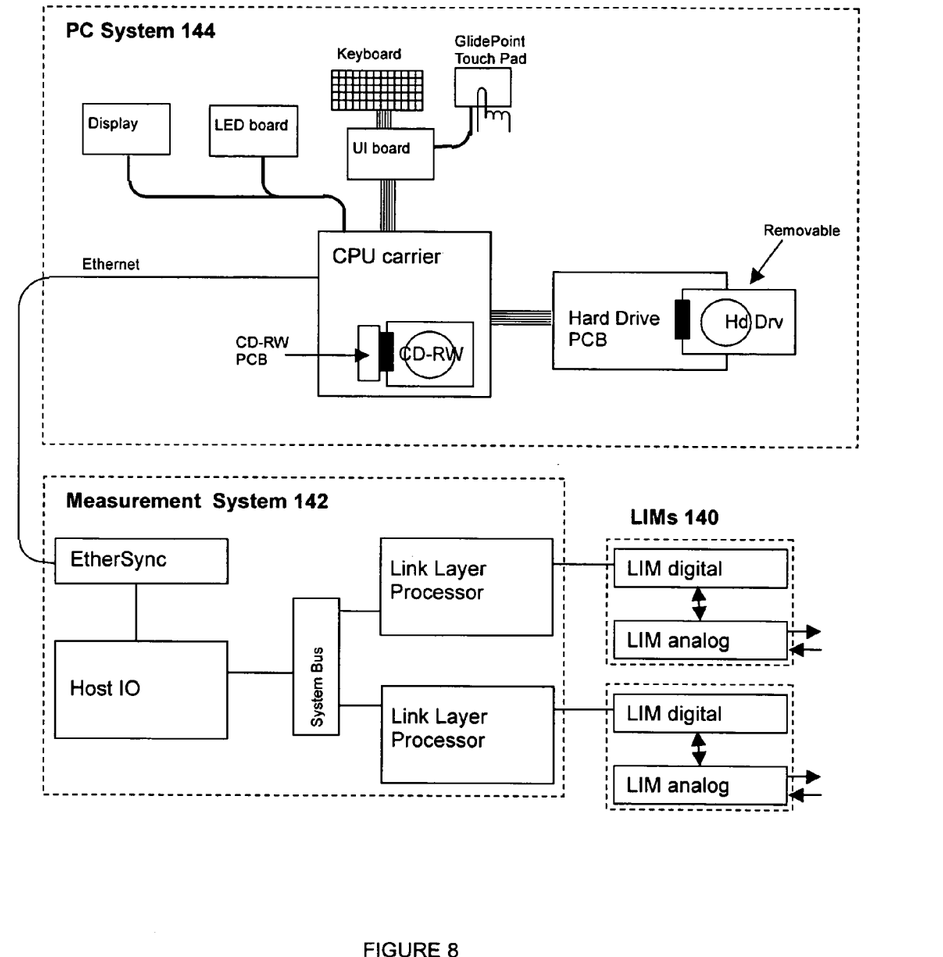
FIG. 8 shows network monitor equipment.

FIG. 8 shows network monitor equipment. Analog and digital line interface modules (LIMs) 140 receive physical line signals and output digital traffic to link layer processors of a Measurement System 142. An example of a Measurement System 142 is a J6801A Distributed Network Analyzer available from Agilent Technologies. The Line Interface Modules may perform reassembly and the Link Layer Processors may perform filtering. The Measurement System 142 can pass packets that passed through the filtering process over an ethernet link to a workstation or PC System 144, which can capture the packets to a hard drive or otherwise process the packets. In this case, because filtering has already occurred, there is significant reduction or elimination of user data flowing over the ethernet and onto the hard drive or other storage medium.

Embodiments discussed above may relate to a universal mobile telephony system (UMTS) network monitoring system for capturing intercepted UMTS data. ATM cells from a UTRAN interface may be intercepted. The UTRAN interface may be an Iu interface, an Iur interface, or an Iub interface, which are, respectively, interfaces between a core network (CN) of the UTRAN and a radio network controller (RNC) of the UTRAN, an interface between RNCs of the UTRAN, and an interface between a Node B of the UTRAN and an RNC of the UTRAN. The ATM cells may be reassembled into UMTS packets of the UTRAN, among which user plane packets may be segregated from control plane UMTS packets based on fields and bytes of the reassembled UMTS packets. The control plane packets may be stored to a non-volatile storage medium of the network monitoring system or processed in real time and results thereof displayed graphically.

A volatile or non-volatile computer-readable storage stores information to enable a computer to perform a method of filtering data intercepted from a UTRAN, the method comprising: reassembling the intercepted data to ATM adaptation layer type 2 (AAL2) and to ATM adaptation layer 5 (AAL5) reassembled packets; and automatically filtering the reassembled packets, where a packet is filtered based on: whether it is an AAL2 or an AAL5 packet, its packet length, and whether it is within a virtual path identifier (VPI) and/or virtual channel identifier (VCI) range. FIGS. 5-7 illustrate various types of packets which may be suppressed, including POLL packets, STAT packets, BEGIN packets, END packets, and various types of packets which may not be suppressed, including NBAP packets, ALCQAP packets and RNSAP packets. The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method, comprising:
    employing a line interface module to reassemble data intercepted from a UTRAN into ATM adaptation layer type 2 (AAL2) and into ATM adaptation layer 5 (AAL5) reassembled packets; and
    employing a link layer processor to automatically filter the reassembled packets, where a packet is filtered based on:
    whether it is an AAL2 or an AAL5 packet,
    its packet length, and
    whether it is within a virtual path identifier (VPI) and/or virtual channel identifier (VCI) range.

2. A method according to claim 1, wherein the VPI/VCI range is defined in advance by a user.

3. A method according to claim 1, wherein the filtering is further based on whether the reassembled packet was passing in a downlink direction relative to a corresponding mobile user.

4. A method according to claim 1, wherein the filtering is further based on whether bytes in the packet match particular predefined byte values.

5. A method according to claim 1, wherein the filtering is also based on comparing the packet length to predefined packet filtering lengths.

6. A method according to claim 1, wherein when filtered packets were intercepted from an Iub, the filtering suppresses poll packets, begin packets, end packets, line speech packets, and stat packets.

7. A method according to claim 1, wherein at least one or more of the following types of packets are suppressed by the filtering: POLL packets, STAT packets, BEGIN packets, END packets, or line speech packets.

8. A method according to claim 1, wherein at least two or more of the following types of packets are suppressed by the filtering: POLL packets, STAT packets, BEGIN packets, END packets, or line speech packets.

9. A method according to claim 1, wherein at least three or more of the following types of packets are suppressed by the filtering: POLL packets, STAT packets, BEGIN packets, END packets, or line speech packets.

10. A method according to claim 1, wherein at least four or more of the following types of packets are suppressed by the filtering: POLL packets, STAT packets, BEGIN packets, END packets, or line speech packets.

11. A method according to claim 1, wherein at least the following types of packets are suppressed by the filtering: POLL packets, STAT packets, BEGIN packets, END packets, or line speech packets.

12. A method according to claim 1, wherein at least one or more of the following types of packets are not suppressed by the filtering: NBAP packets, ALCAP packets, RNSAP packets, IP packets, signaling packets, or FP control packets.

13. A method according to claim 1, wherein at least two or more of the following types of packets are not suppressed by the filtering: NBAP packets, ALCAP packets, RNSAP packets, IP packets, signaling packets, or FP control packets.

14. A method according to claim 1, wherein at least three or more of the following types of packets are not suppressed by the filtering: NBAP packets, ALCAP packets, RNSAP packets, IP packets, signaling packets, or FP control packets.

15. A method according to claim 1, wherein at least four or more of the following types of packets are not suppressed by the filtering: NBAP packets, ALCAP packets, RNSAP packets, IP packets, signaling packets, or IFP control packets.

16. A method according to claim 1, wherein at least five or more of the following types of packets are not suppressed by the filtering: NBAP packets, ALCAP packets, RNSAP packets, IP packets, signaling packets, or FP control packets.

17. A method according to claim 1, wherein at least the following types of packets are not suppressed by the filtering: NBAP packets, ALCAP packets, RNSAP packets, IP packets, signaling packets, or FP control packets.

18. A network monitoring apparatus configured to perform the method according to claim 1.

19. A volatile or non-volatile computer-readable storage storing information to enable a computer to perform a method according to claim 1.

20. The method of claim 1, further comprising:
    the link layer processor discarding the reassembled packets that do not satisfy filter conditions of the filter; and
    storing in a storage medium the reassembled packets that do satisfy filter conditions of the filter.

* * * * *

UNITED STATES PATENT AND TRADEMARK OFFICE
CERTIFICATE OF CORRECTION

PATENT NO. : 7,630,318 B2 Page 1 of 1
APPLICATION NO. : 11/011067
DATED : December 8, 2009
INVENTOR(S) : Robert Geoffrey Ward et al.

It is certified that error appears in the above-identified patent and that said Letters Patent is hereby corrected as shown below:

In column 6, line 28, in Claim 15, delete "IFP" and insert -- FP --, therefor.

Signed and Sealed this

Sixteenth Day of February, 2010

David J. Kappos
*Director of the United States Patent and Trademark Office*